(12) United States Patent
Krishnaswamy (10) Patent No.: US 11,537,781 B1
(45) Date of Patent: Dec. 27, 2022

(54) SYSTEM AND METHOD TO SUPPORT SYNCHRONIZATION, CLOSED CAPTIONING AND HIGHLIGHT WITHIN A TEXT DOCUMENT OR A MEDIA FILE

(71) Applicant: Lumos Information Services, LLC, Piscataway, NJ (US)

(72) Inventor: Mukunda Krishnaswamy, Princeton, NJ (US)

(*) Notice: Subject to any disclaimer, the term of this patent is extended or adjusted under 35 U.S.C. 154(b) by 0 days.

(21) Appl. No.: 17/476,381

(22) Filed: Sep. 15, 2021

(51) Int. Cl.
*G06F 17/00* (2019.01)
*G06F 40/109* (2020.01)
*G06F 16/583* (2019.01)
*G06F 16/683* (2019.01)

(52) U.S. Cl.
CPC ........ *G06F 40/109* (2020.01); *G06F 16/5846* (2019.01); *G06F 16/685* (2019.01)

(58) Field of Classification Search
CPC ... G06F 40/109; G06F 16/5846; G06F 16/685
See application file for complete search history.

(56) References Cited

U.S. PATENT DOCUMENTS

| | | | |
|---|---|---|---|
| 5,649,060 A * | 7/1997 | Ellozy | G11B 27/10 704/235 |
| 8,281,231 B2 | 10/2012 | Berry et al. | |
| 8,564,721 B1 | 10/2013 | Berry et al. | |
| 9,478,219 B2 | 10/2016 | Kurzweil et al. | |
| 9,558,733 B1 * | 1/2017 | Korn | G10L 13/08 |
| 10,210,769 B2 * | 2/2019 | Simmons | G09B 17/02 |
| 11,017,488 B2 * | 5/2021 | Evans | G06F 16/44 |
| 11,423,073 B2 * | 8/2022 | Kikin-Gil | H04L 65/4015 |
| 2004/0260535 A1 * | 12/2004 | Chen | G06F 9/543 704/9 |
| 2009/0202226 A1 * | 8/2009 | McKay | G09B 5/06 704/260 |
| 2014/0186010 A1 * | 7/2014 | Guckenberger | G11B 27/11 386/248 |
| 2018/0096203 A1 * | 4/2018 | King | G06F 16/93 |
| 2019/0172166 A1 * | 6/2019 | Evans | H04N 21/41407 |
| 2019/0196675 A1 * | 6/2019 | German | G06V 30/414 |
| 2021/0057063 A1 * | 2/2021 | Tignanelli | G10L 15/26 |
| 2022/0174216 A1 * | 6/2022 | Ozone | H04N 5/23258 |

FOREIGN PATENT DOCUMENTS

| | | | |
|---|---|---|---|
| AU | 2016202974 | | 6/2016 |
| CA | 2417146 | | 4/2002 |
| CN | 110889404 A | * | 3/2020 |
| JP | 4038211 | | 5/2006 |
| JP | 5463385 | | 1/2013 |

* cited by examiner

*Primary Examiner* — Laurie A Ries (57) ABSTRACT

The present invention relates to a system and method for synchronizing and highlighting a target text and audio associated with a reference document. The system and method may comprise one or more of an input unit, an extracting unit, a mapping unit, a processing unit, and an image resizing unit. The system and method may synchronize the target text and audio in order to provide a user with a Read Along. The invention further synchronizes and highlights closed captions and audio that helps people with hearing impairment to comprehend better while watching a movie or listening to songs.

20 Claims, 11 Drawing Sheets

SYSTEM AND METHOD TO SUPPORT SYNCHRONIZATION, CLOSED CAPTIONING AND HIGHLIGHT WITHIN A TEXT DOCUMENT OR A MEDIA FILE

TECHNICAL FIELD OF INVENTION

The invention relates to synchronizing the text associated with media files of any type, including but not limited to image-based files, PDF files, and other media files. It is also inclusive of generating closed captioning and dynamic text highlighting in synchronization with the media files' audio tracks.

BACKGROUND OF THE INVENTION

Over the years, with technological advancement, the synchronization of media with associated text has come a long way. Cutting-edge technologies such as artificial intelligence and complex algorithms have been instrumental in bringing such advancement. However, the most significant advancement has been the ability to help learners become efficient readers and help people with disabilities such as hearing impairment, who struggle to effectively comprehend textual matter associated with media files such as video or audio files.

Reading skills are essential for the holistic development of individuals. They are vital for adults to have a competitive edge over their peers. They put them on a trajectory of exponential career and personal growth. Reading skills are imperative for children to become successful in their life. A child gains exposure to novel things, ideas, information, and a whole new world of imagination through reading. Reading helps a child to communicate better. It improves the child's language skills.

Furthermore, reading assists a child in acquiring better comprehension skills and expanding vocabulary. Reading allows the child to take on the world with greater confidence. Reading skills are also necessary because it develops the child's mind and the creative side. While there are various methods used by parents, educators, and learners to improve their child's reading skills, Read-Along has proven to be an effective strategy. Read-Along refers to reading some text simultaneously with another person or automated performance, as on a general-purpose or special-purpose computer to help learners become efficient readers.

Electronic media plays a significant role in maintaining the essence of read-along programs that imitate the traditional reading time between a parent or an educator and an end-user of the program. Traditional Read-Along programs involve classroom teacher reading to students for about 30 minutes in a day as a reading intervention. In many instances, students are grouped based on their reading proficiency to make the program effective. It, however, creates a feeling of being left out among many students. The result is that not all students come out of a particular grade as proficient readers. There are now various online formats available to assist and encourage read-aloud sessions helping users become experienced readers at any phase of their lives with technology. Technology such as speech-to-text analysis on an audio file is widely used in such online programs. However, they have their shortcomings, they do not provide a tool that reflects natural reading setup and experience to the users. The speech and the text do not go along with each other very well.

Videos are one of the most engaging instructional tools. However, individuals with hearing impairment find it difficult to follow the video about what is being said in it. Captions allow such individuals to follow both dialogues and the audio simultaneously. Typically, people with hearing disabilities fail to comprehend the audio content of a video. Most of the technologies available do not target users with disabilities who require additional help in relating audio or video with associated text by providing better, accurate, and distinct closed captions. They do provide captions, but the users with hearing impairment do not get to identify the dialog with the caption since the captions are not highlighted to stand distinct to ensure better readability, timed accurately, and provide efficient synchronization of audiovisual content. According to the National Association of the deaf, "Captioning makes audio and audiovisual material accessible and provides a critical link to communication, information, education, news, and entertainment for more than 36 million Americans who are deaf or hard of hearing". With the help of closed captions, such individuals may be able to read what is displayed, but cannot relate it with the audio and video effectively. They must really enjoy the story while reading, watching a movie, or listening to songs. They need technology that not only helps them to see and read the closed caption but also know which word is specifically spoken by an actor or a speaker, thus helping them to understand and comprehend better.

One prior art patent application, US 20190172166A1, titled, "Systems methods and user interface for navigating media playback using scrollable text" discloses techniques for transcript management utility for the display of smoothly scrolling, synchronized text and multimedia for use on a mobile computing device, where the user may perform a gesture on the text to cause the multimedia to jump to the desired location and begin playback. Even though this patent application mentions synchronizing text with multimedia, it does not mention the synchronization of text during a Read-Along and highlighting of text along with a closed caption. Also, this prior art is only for mobile devices.

Another prior art patent, U.S. Pat. No. 8,564,721B1, titled, "Timeline alignment and coordination for closed-caption text using speech recognition transcripts" relates to video and associated audio transcripts and closed-captioned text, and more particularly, to methods and systems for automatically and correctly aligning the timeline of audio transcripts with the corresponding video for indexing, accurate metadata capture, and usage, and for improved searching and playback presentation purposes. This prior art has a cross-reference to another prior art patent U.S. Pat. No. 8,281,231B2. These pieces of the prior art do not disclose highlighting of closed-captioned text, also synchronizing and highlighting the text associated with other file types such as, though not limited to a Jpeg or a PDF file. Furthermore, this piece of prior art does not allow the user to select their preference in color or font size while viewing the closed-captioned text.

One prior art patent application, AU2016202974B2, titled "Automatically creating a mapping between text data and audio data" discloses Techniques for creating a mapping that maps locations in audio data (e.g., an audiobook) to corresponding locations in text data (e.g., an e-book). This piece of the prior art relates to automatically creating a mapping between text data and audio data by analyzing the audio data to detect words reflected therein and compare those words to words in the document. It relates to receiving audio data that corresponds to at least a portion of a work, wherein at least a portion of a textual version of the work is displayed. It further includes performing a speech-to-text analysis of the audio data to generate text for portions of the audio data, wherein the speech-to-text analysis employs a sliding window, wherein the sliding window is configured to include text preceding and following a speech-to-text translation position in the textual version of the work and move based on the speech-to-text translation position, and a set of words into which the audio data can be translated is limited to words in the sliding window and based on the text generated for the portions of the audio data, generating a mapping between a plurality of audio locations in the audio data and a corresponding plurality of text locations in the textual version of the work. Even though this art mentions performing speech-to-text analysis, the art does not completely cover relevant factors that are required to provide a natural setup that offers a holistic read-along experience to young readers. Also, it does not include synchronization and highlighting of text within an image file such as a jpeg file with an audio file. Furthermore, they do not provide any mechanism to help people with disabilities to comprehend text associated with audio and/or video as it does not provide closed captioning and highlighting of closed captions.

Another prior art Patent "U.S. Pat. No. 9,478,219B2" titled "Audio synchronization for document narration with user-selected playback" discloses techniques and systems to provide a narration of a text. In some aspects, the techniques and systems described herein include generating a timing file that includes elapsed time information for expected portions of text that provide an elapsed time period from a reference time in an audio recording to each portion of text in recognized portions of text. This piece of prior art emphasizes more on different types of voices that could be associated with the text. It relates to a system that can provide a visual indication, such as highlighting, of which portions are associated with which voice models in the electronic document. It does not take into consideration how to retain the pictures found within an image-based document such as a jpeg file or a pdf file during a read-along session, which renders a holistic and natural reading experience to the users.

Another prior art Patent, "JP4038211B2", titled, "Speech synthesis apparatus, speech synthesis method, and speech synthesis system" relates to a speech synthesis technology that reads out an input sentence and outputs speech, for example. In particular, the speech synthesis apparatus and speech are suitable for use in speech synthesis technology for synthesizing speech that is easy to hear by emphasizing a specific part of the sentence. It relates to enhancement degree determined based on the frequency of occurrence of each word or continuous word included in the text to determine the enhancement degree for each word or phrase was extracted extracts highlight the word or phrase to be out of the word or phrase extracted based on the appearance frequency of each word or continuous word included in the text A and an acoustic processing unit that synthesizes the speech to which the emphasis degree determined by the emphasis degree determination unit is added to each word or collocation to be emphasized. This invention primarily relates to enhancing the pitch frequency to resemble a natural sound or a human voice rather than a speech output as read by a Robot. This only helps a user achieve better text-to-speech conversion and is not useful for users with hearing impairment.

Another prior art Patent, "CA2417146C," titled, "Method and system for synchronizing audio and visual presentation in a multi-modal content renderer" relates to providing a multi-modal renderer that simultaneously renders content visually and verbally in a synchronized manner. It also relates to automatic scrolling as the audio presentation progresses, as well as word-to-word highlighting. Furthermore, it also relates to providing a multi-modal renderer that allows content encoded using an eXtensible Markup Language (XML) based markup tag set to be audibly read to the user. This piece of prior art specifies examples of a long piece of content that may be visually rendered on multiple pages. A further complication is that the visual presentation and audible presentation may not map one-to-one. Some applications may want some portions of the content to be rendered only visually, without being spoken. Some applications may require content to be spoken, with no visual rendering. Other cases lie somewhere in between. For example, an application may want a person's full name to be read while a nickname is displayed visually. This piece of prior art primarily focuses on content renderers (e.g., Web browsers) For example, in an automotive setting a driver and/or a passenger might be interlacing with a device. While driving, the driver obviously cannot visually read a screen or monitor on which the information is displayed. The driver could, however, select options pertaining to which information he or she wants the browses to present audibly. The passenger, however, may want to follow along by reading the screen while the audio content is read aloud. Also, consider the situation of an illiterate or semi-literate adult. He or she can follow along when the browser is reading the text, and use it to learn reading and recognize new words. Such a browser may also assist the adult in learning to read by providing adult content, rather than content aimed at a child learning to read. This piece of prior art completely does not cover relevant factors that are required to provide a natural setup that offers a holistic read-along experience to young readers. They do not provide a Read-Along mechanism where the user reads along with an expert reader which improves their reading skills. Furthermore, the invention does not take into consideration the highlighting of closed captions that is very useful for users with hearing impairment.

Another prior art Patent, "JP5463385B2", titled, "Automatic creation of mapping between text data and audio data" relates to automatic creation of a mapping between text data and audio data by audio data analysis that detects words reflected in audio data and compares those words with words in a document. This piece of prior art mainly focuses on switching between electronic books and audiobooks easily without being time-consuming. It does not take into consideration relevant factors that are required to provide a natural setup that offers a holistic read-along experience to users.

In the aforementioned specific pieces of prior arts, it is clear that most of them use speech-to-text technology or use closed captioning of text with audio or video file. They apply speech analysis to audio and extract text from it while using the audio. The extracted text is mainly used to sync an electronic version of a book to an audiobook, render the audio and text in a web browser, or mostly narrate the text. They do not help the users become effective readers by providing them an enriching learning experience. Furthermore, they do not offer the look and feel of an actual read-along experience, which makes learning more interactive by retaining the graphics as is that is associated with the text. Furthermore, they do not highlight text associated with an image or a pdf file or highlight the closed captions associated with a Media file to help individuals become effective readers or to help individuals with hearing impairment to enjoy a video in its entirety.

There is an evident need for tools to overcome the shortcomings in the afore-mentioned Patent applications and prior arts. These tools should help individuals become effective readers. Furthermore, they must support individuals with hearing disabilities comprehend printed text, audio, or a video while watching a TV program or a movie, thus helping them understand the complete story and become proficient readers.

RELATED APPLICATIONS

This application is related to pending U.S. application Ser. No. 17/237,016 entitled "SYSTEM AND METHOD FOR ANALYSING AN AUDIO TO MEASURE ORAL READING FLUENCY" filed on Apr. 21, 2021, which is incorporated herein by reference in its entirety.

OBJECTIVE OF INVENTION

The objective of the invention is to provide an online tool for learners and people with disabilities to read effectively and comprehend better. It aims to provide an online, self-paced learning environment to children from early on through a robust Read-along program with synchronizing and highlighting every word they hear from an expert reader to learn and assimilate reading efficiently.

The invention provides children an engaging reading experience that very closely resembles an actual reading experience and bridges the learning gaps that are seen in a traditional Read-Along program. It provides a mechanism to integrate digital tools into traditional teaching and learning, thus shaping curriculum and instructions during unprecedented times such as the Covid 19 pandemic.

Furthermore, the invention is a powerful tool for people with hearing impairment to connect audio and video with the associated text through closed captions that helps them to comprehend better while watching a movie or listening to songs.

SUMMARY OF INVENTION

A system and method to achieve the objective of the invention for providing a set of online tools that will help individuals become efficient readers and to aid individuals with hearing impairment to comprehend the text, audio, and video efficiently.

The system includes an input unit, extracting unit, mapping unit, image resizing unit, and processing unit.

The input unit receives a reference document. The reference document could be, though not limited to, a text file, a jpeg file, or a pdf file. In some embodiments, the reference document maybe a book with a plurality of pages. Additionally, the input unit further receives a Media file. The Media file could be, though not limited to, an audio or a video file.

The extracting unit extracts at least one of the target text, generates target audio of the target text, Target Transcription from Reference document, Speech Marks for the target text and the Target Transcription, and one or more coordinates for the target text embedded within an image-based reference document such as a jpeg document. The target text relates to text embedded within the reference document. The target audio relates to the audio version of the target text or relates to the audio of an expert reader. The Target Transcription refers to the text associated with the Media file or the target audio. The Speech Marks refer to the time coefficient of the target text and Target Transcription. The Coordinates refer to the position of the target text in the image-based reference document such as a jpeg document.

If the input unit receives image-based reference documents such as a jpeg document, bounding boxes are generated, which will provide the one or more coordinates of target text in each image. Bounding boxes relate to the borders drawn around the target text based on the one or more Coordinates of the target text.

Furthermore, the extracting unit generates a Target Transcription from the reference document. Then, based on the Target Transcription, the speech marks are generated. In the case of a reference document being an image file, based on the Target Transcription, speech marks are generated along with the one or more coordinates. The extracting unit also provides for the editing of Target Transcription and speech marks if the one or more coordinates of the Target Transcription and the speech marks are not accurate.

The mapping unit maps the one or more coordinates with the target text, Target Transcription, Speech Marks, and the target audio.

The Image resizing unit is used to dynamically resize the target text and the rendered text embedded within the reference document. The rendered text relates to the text displayed on a device. The device could be any standalone or handheld device.

The Processing unit synchronizes the target audio with the target text embedded within a reference document, Target Transcription, Speech Marks for the target text, and one or more coordinates for the target text embedded within an image-based reference document such as a jpeg document. The Processing Unit also highlights the rendered text based on the target audio. The rendered text relates to the text displayed on a device. The device could be any standalone or handheld device. The processing unit also displays the closed caption of the Target Transcription and begins highlighting rendered text based on the elapsed time. In addition, the rendered text is highlighted based on the color and font size preferences of the users.

Furthermore, the processing unit provides for automatic navigation from the reference document. Reference document maybe a book with multiple pages, wherein each page is displayed one at a time on the screen of a user's device, one page after another, to have a continuous stream of the target audio. The processing unit is further adapted to continue from a position of the target text in the reference document as selected by a user.

According to some embodiments of the system, the input unit receives a reference document. The reference document may be, though not limited to, a jpeg file, a pdf file.

According to some embodiments of the system, the input unit receives a Media file. The Media file, though not limited to, could be an Audio file or a Video file.

The extracting unit converts the target text in the reference document to target audio and generates speech marks. In addition, it generates one or more coordinates for the target text in the case of an image-based reference document such as a jpeg document. This embodiment is beneficial as it provides the requisite inputs for mapping the target audio and the target text resulting in an enriching reading experience for the user.

According to some embodiments of the system, the extracting unit extracts the transcript and Speech marks from the audio of an expert reader or video. Furthermore, it generates one or more coordinates for the transcription. This embodiment is beneficial as the input unit can receive the audio of an expert reader.

According to some embodiments of the system, the extracting unit provides for the editing of Target Transcription and speech marks if the one or more coordinates of the transcription and the speech marks are not accurate. This embodiment is beneficial as it allows the expert reader to edit the speech marks to remove additional speech marks generated by the system or add missing words providing a holistic reading experience to young readers.

According to some embodiments of the system, the mapping unit maps the one or more coordinates with the target text, Target Transcription, Speech Marks, and the target audio. This embodiment is beneficial as it references the exact position of the target text within a reference document.

According to some embodiments of the system, the image resizing unit is used to dynamically resize the target text and a rendered text embedded within the reference document. This embodiment is beneficial as it provides a mechanism to adjust the image size and the target text automatically. E.g., If the size of the image is 1000 pixels and the size of the device is 400 pixels, the system automatically resizes the image. In addition, it adjusts the coordinates of the target text, providing a consistent reading experience for the User irrespective of the size of the device.

According to some embodiments of the system, the Processing unit provides an enriching and natural reading experience during a Read-Along. The Processing unit synchronizes the target audio with the target text embedded within a reference document and Speech Marks based on the one or more coordinates.

According to some embodiments of the system, the Processing Unit highlights the rendered text based on the target audio during the Read along. Once the User decides to execute the Read-Along operation, the processing unit will draw the first image onto a drawing surface, play the target audio, and highlight rendered text based on the elapsed time.

According to some embodiments of the system, the Processing Unit highlights the rendered text based on the target video during playback. Once the User decides to play the target video, the processing unit will display a closed caption of the Target Transcription and highlight rendered text based on the elapsed time.

According to some embodiments of the system, the processing unit highlights the rendered text based on the color of preference of the users.

According to some embodiments of the system, the color of the highlighting may be a vibrant color.

Target Text is highlighted by creating a rectangle, with slight padding, around that text, using its coordinates, and filling it with a color. When the program reaches the last target text in the reference document, it will automatically 'redraw' the next image onto the existing drawing surface. This embodiment is beneficial as it allows users to listen to how each word needs to be pronounced and helps improve reading and listening skills.

According to some embodiments of the system, the processing unit provides automatic navigation from one page to another. This embodiment is beneficial as it provides for a continuous stream of the target audio.

According to some embodiments of the system, If the one or more target text is within a reference document in a pdf format, the User will also have the option of selecting any target text on any page to start reading from that selected target text. This embodiment is beneficial as it allows the User to begin practicing their reading from the last stopped position.

The object of the invention is also achieved by a method for providing a set of online tools that will help individuals become efficient readers and to comprehend the text, audio, and video better for individuals with hearing impairment.

According to some embodiments, the first step of the method includes receiving a reference document through an input unit. The reference document could be, though not limited to, a jpeg file or pdf file. The second step includes extracting the target text in the reference document. The third step comprises converting target text in the reference document to a target audio and generating speech marks and Target Transcription of the target audio using an extracting unit. The fourth step includes generating one or more coordinates of the target text in the case of an image-based reference document such as a jpeg file using the extracting unit. The fifth step includes editing Speech Marks and one or more coordinates of the target text if they are not accurate using the extracting unit. The sixth step includes mapping Target Audio, Speech marks, and one or more coordinates of the Target text in the reference document. The seventh step includes dynamic resizing the target text with the rendered text using an Image Resizing unit. The eighth step includes synchronizing the target audio with the target text and highlighting the target text during Read-Along using a Processing unit. The target text is highlighted as per the color preferred by the users. The ninth step includes selecting target text on any page of the reference document by the User to start reading from that selected target text using the Processing Unit. The final step includes automatic navigation from one page to another using the Processing unit to stream the target audio continuously.

According to some embodiments, the first step of the method includes receiving a Media file through an input unit. The Media file could be, though not limited to, an audio file or a video file. The second step includes generating a Target Transcription for the target audio or video using an extracting unit. The third step comprises generating speech marks for the Target Transcription. The fourth step includes editing of Target Transcription and speech marks that are not accurate. The fifth step includes mapping of Speech Marks, the target audio, and the Target Transcription using a mapping unit. The Sixth step includes the generation of closed captions for a video file received by the input unit. The seventh step includes synchronizing the said video with closed captions. The eighth step provides for the highlighting of closed captions during playback of the said video. The final step comprises automatic navigation from one page to another using the Processing unit to stream the target audio continuously.

The object of the invention is also achieved by a computer program product stored on a non-transitory computer-readable medium and which can be executed on one or more processors, wherein the non-transitory computer-readable medium and the one or more processors are adapted to be coupled to a communication network interface. The computer program product is able, on execution, to enable the one or more processors to perform the following steps comprising:

receiving a reference document and/or a Media file, through an input unit. The reference document could be, though not limited to, a jpeg file or pdf file. The Media file could be, though not limited to, an audio file or a Video file.

Extracting the target text in the reference document and generating target audio and speech marks for the target text.

Generating one or more coordinates for the target text embedded within an image-based reference document such as a jpeg document.

Editing of Target Transcription and speech marks.

Mapping of the one or more coordinates with the target text, Speech Marks, and the target audio using a mapping unit.

Dynamic resizing of the target text with the rendered text using an Image Resizing unit.

Synchronizing the target audio with the target text and highlighting the target text as per the preference of the users during Read-Along and during playback of video file using the Processing unit.

Processing of Target Transcription of video file as the input file and display closed captions on the device. The device could be a standalone or a handheld device.

Navigating automatically from one page to another using the Processing unit in order to have a continuous stream of the target audio.

Selecting target text on any page of the reference document by the User to start reading from that selected target text using the Processing Unit.

BRIEF DESCRIPTION OF DRAWINGS

FIG. 2C.1 represents a screenshot of the image before being subjected to the method dynamic resizing of the image using the image resizing unit.

FIG. 2C.2 represents a screenshot of the image after being subjected to the method dynamic resizing of the image using the image resizing unit.

The figures depict embodiments of the disclosure for purposes of illustration only. One skilled in the art will readily recognize from the following description that alternative embodiments illustrated herein may be employed without departing from the principles of the disclosure described herein.

DETAILED DESCRIPTION

The description provided herein describes example embodiments of the present invention and is not intended to limit the invention to any particular embodiments or combination of embodiments. The drawings provided herein are for the purpose of example and are not intended to limit the invention to any particular embodiment or combination of embodiment. The embodiments are described herein for illustrative purposes and are subject to many variations. It is understood that various omissions and substitutions of equivalents are contemplated as circumstances may suggest or render expedient, but are intended to cover the application or implementation without departing from the spirit or scope of the present invention. Furthermore, it is to be understood that the phraseology and terminology employed herein are for the purpose of the description and should not be regarded as limiting. Any heading utilized within this description is for convenience only and has no legal or limiting effect.

The terms "a" and "an" herein do not denote a limitation of quantity, but rather denote the presence of at least one of the referenced items.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more subsystems or elements or structures or components preceded by "comprises... a" does not, without more constraints, preclude the existence of other sub-systems, elements, structures, components, additional sub-systems, additional elements, additional structures, or additional components. Appearances of the phrase "in an embodiment", "in another embodiment", and similar language throughout this specification may, but not necessarily do, all refer to the same embodiment.

The invention relates to providing a set of online tools that will help individuals become efficient readers and to aid individuals with hearing impairment to comprehend the text, audio, and video efficiently.

Figure 1:
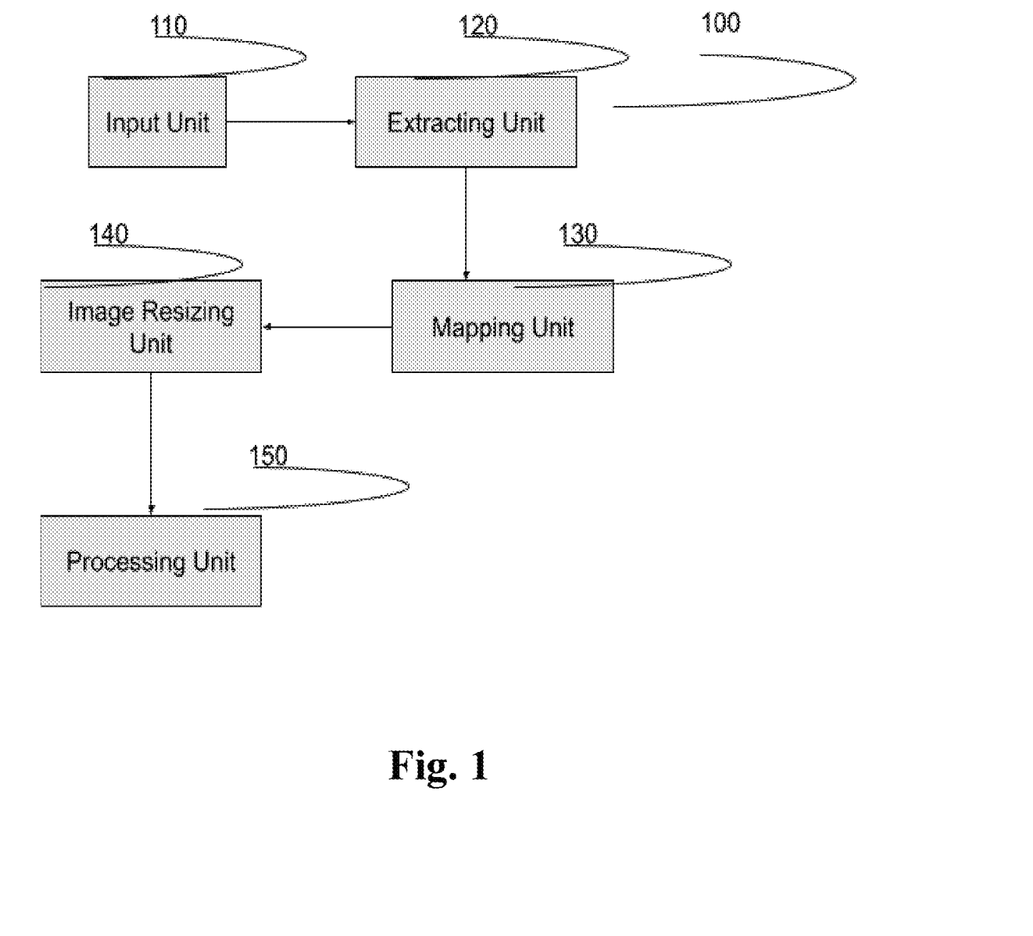
FIG. 1 represents a block diagram of a system to help users become efficient readers and support individuals with hearing impairment to see and comprehend the audio and video by providing highlighted closed captions of the rendered text as per embodiments of the present disclosure.

FIG. 1 represents a schematic diagram of a system 300 for making users of the system efficient readers and also to help individuals with hearing impairment to see and comprehend the audio and video by providing highlighted closed captions of the text associated with such files.

The system 100 includes an input unit 110 to receive a reference document that could be, though not limited to, a jpeg file or a pdf file. In some embodiments, the reference document is a book with a plurality of pages.

According to some embodiments, the input unit further receives a Media file. The Media file could be, though not limited to, an audio or a video file.

The system 100 includes an extracting unit 120 to extract target text in the reference document to target audio and speech marks. This embodiment is beneficial as it provides the requisite inputs for mapping the target audio and target text and provides an enriching reading experience to the user.

In some embodiments, the system 100 includes an extracting unit 120 to generate one or more coordinates for the target text in the case of an image-based reference document such as a Jpeg file.

In some embodiments, the extracting unit 120 generates the Target Transcription and Speech marks from the audio of an expert reader or a video file. This embodiment is beneficial as the input unit can receive the audio of an expert reader or a media file such as a video file.

In some embodiments, the extracting unit 120 provides for editing Target Transcription and speech marks if the Target Transcription and the speech marks are not accurate. This embodiment is beneficial as it allows the expert reader to edit the speech marks to remove additional speech marks generated by the system or add missing words providing a holistic reading experience to young readers.

The system 100 includes a mapping unit 130 to map the one or more coordinates with the target text, Target Transcription, Speech Marks, and the target audio. This embodiment is beneficial as it references the exact position of the target text within a reference document.

The system 100 further includes an Image resizing unit 140, which is used to dynamically resize the target text and a rendered text embedded within the reference document. The rendered text relates to the text displayed on a device. The device could be any standalone or handheld device. An illustration is shown with highlighting being synchronized with text because of dynamic resizing and highlighting without synchronization with text as it did not go through this unit.

The System 100 further includes a Processing unit 150 to provide an enriching and close to actual reading experience during a Read-Along for learners to make them effective readers. Read-Along refers to either computer-generated audio or an expert reader reading the target text. The Processing unit synchronizes the target audio with the target text embedded within a reference document and Speech Marks for the target text and the Target Transcription and one or more coordinates for the target text embedded within an image-based reference document such as a jpeg document.

According to some embodiments, the Processing Unit 150 highlights the rendered text based on the target audio during the Read along. Once the User decides to execute the Read-Along operation, the processing unit will draw the first image onto a drawing surface, play the target audio, and highlight rendered text based on the elapsed time.

In some embodiments, the processing unit 150 highlights the rendered text based on the target video during playback. Once the User decides to play the target video, the processing unit will display a closed caption of the Target Transcription and highlight rendered text based on the elapsed time.

According to some embodiments, the processing unit 150 highlights the rendered text based on the color of preference of the users.

According to some embodiments, the processing unit 150 will play the target audio or video and highlight the text based on the elapsed time. Each target text is highlighted by creating a rectangle, with slight padding, around the target text, using its coordinates, and filling it with color.

According to some embodiments, the processing unit 150 provides automatic navigation from one page to another to have a continuous stream of the target audio. This embodiment is beneficial as it provides for a continuous stream of the target audio.

According to some embodiments, If the one or more target text is within a reference document in a pdf format, the processing unit 150 allows the user to select any target text on any page to start reading from that selected target text. This embodiment is beneficial as it allows the user to begin practicing their reading from the position where they last stopped.

Figure 2:
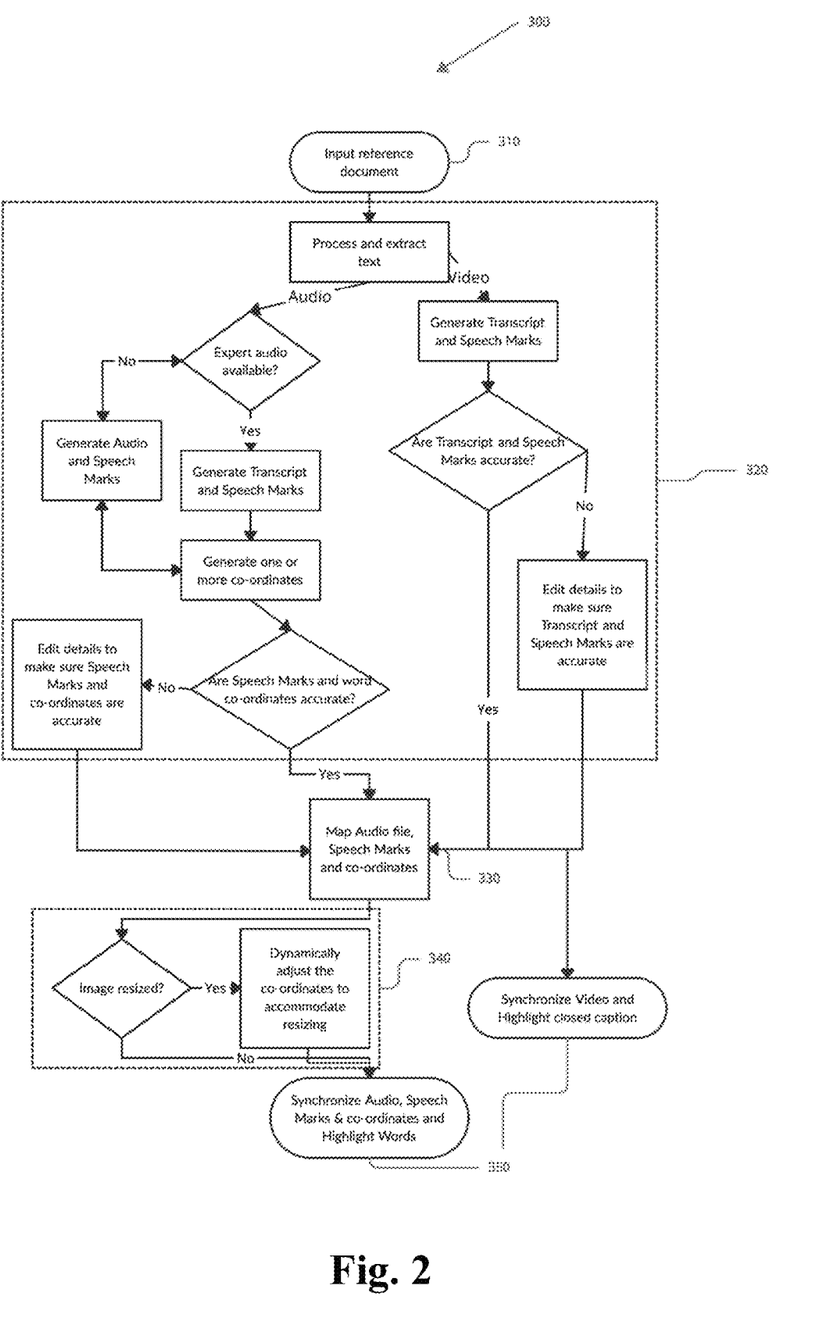
FIG. 2 represents a flowchart showing a method for providing steps to help users of the system become efficient readers and also to help individuals with hearing impairment to see and comprehend the audio and video by providing highlighted closed captions of the rendered text as per the embodiments of the present disclosure.

FIG. 2 illustrates a method 300 to provide tools and resources to assist individuals in becoming efficient readers and help individuals with hearing impairment see and comprehend the video or audio better using highlighted closed captioning of text associated with the said audio or the video files. The method includes the following steps:

The first step includes an input step 310, to receive the reference document.

The reference document could be, though not limited to, a jpeg file or a pdf file. The input unit further receives a Media file. The Media file could be, though not limited to, an audio or a video file.

Figure 2A:
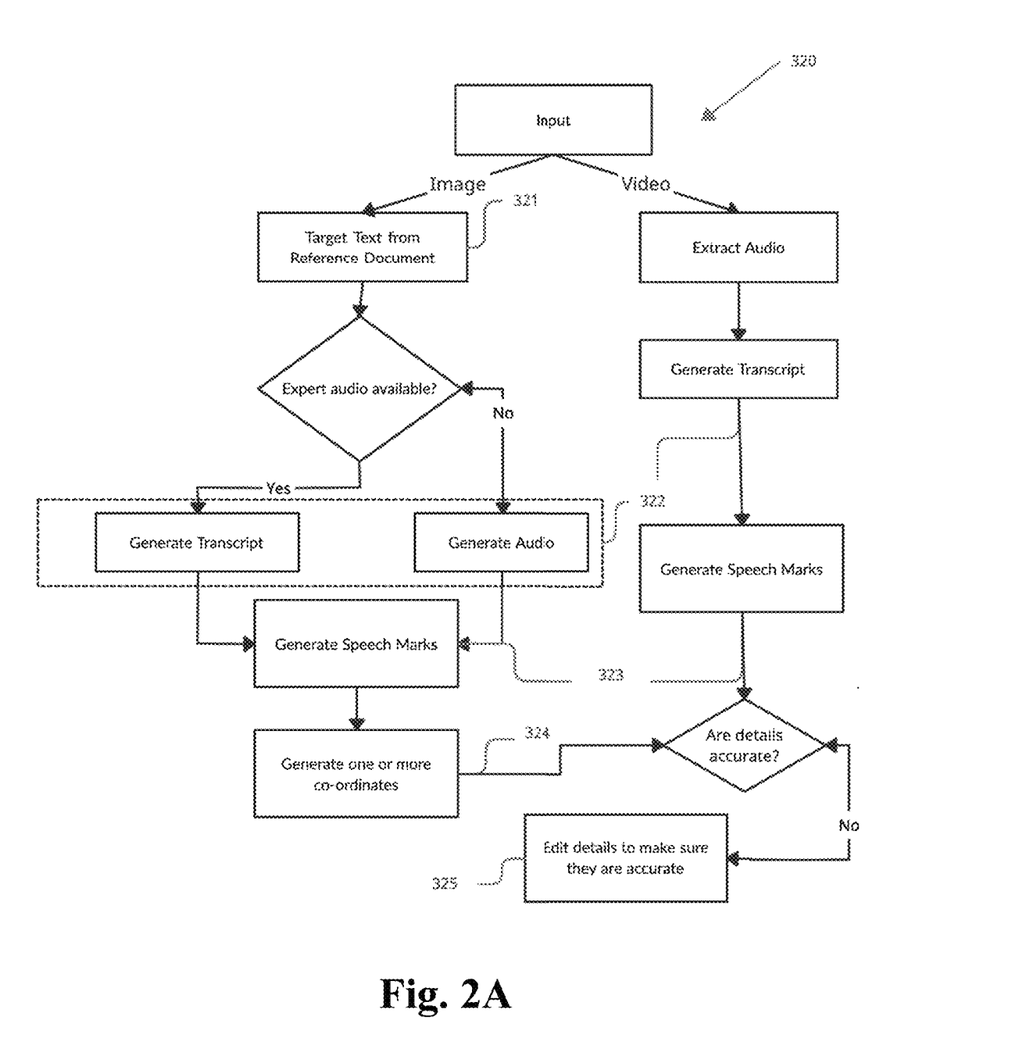
FIG. 2A represents a flowchart showing a method for extracting Target Text, Target audio, generating Speech marks, Target Transcription, one or more coordinates of image-based reference document such as a Jpeg file using an extracting unit, 120

The second step includes extracting step 320, to extract target text in the reference document to target audio and speech marks. It further extracts one or more coordinates for the target text in the case of an image-based reference document such as a Jpeg file.

The third step includes extracting step 320 to extract the Target Transcription and Speech marks from the audio of an expert reader or a Media file such as a video file.

The fourth step includes extracting step 320 to provide the editing of Target Transcription and speech marks if the Target Transcription and the speech marks are not accurate.

Figure 2B:
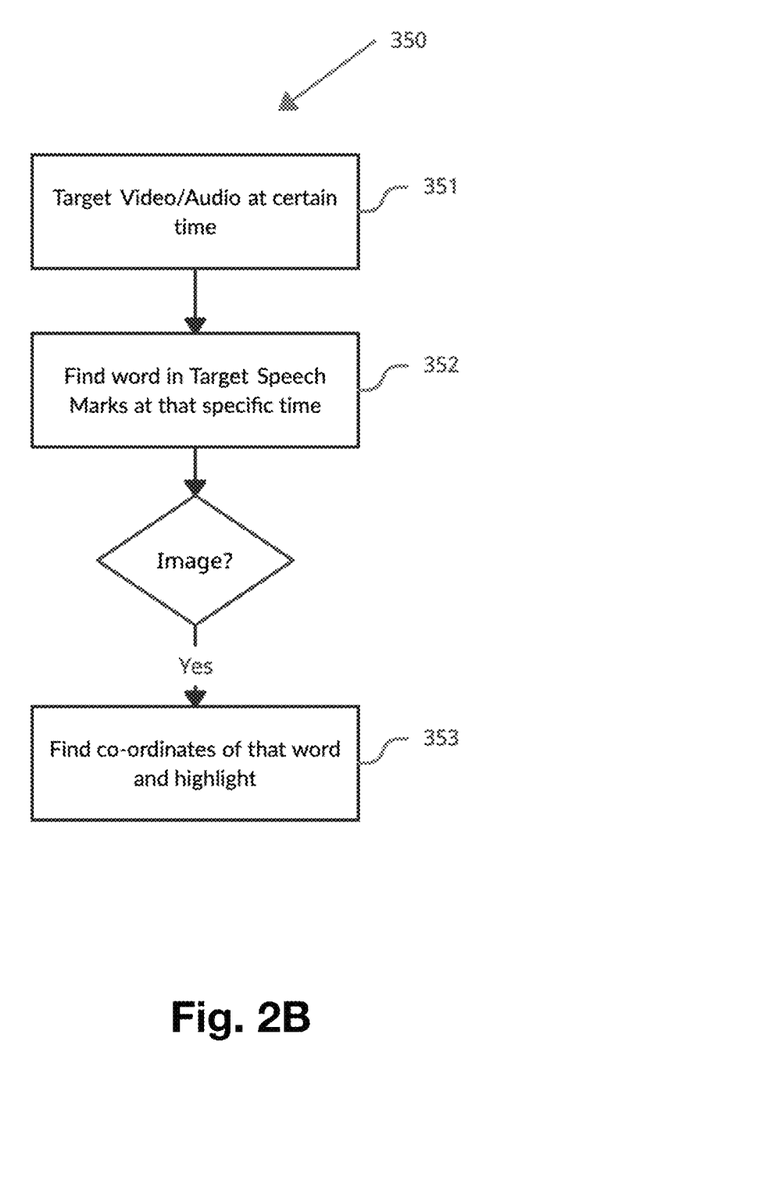
FIG. 2B represents a flowchart showing a method for mapping the Target audio, Speech marks, and one or more coordinates of image-based reference documents such as a Jpeg file using a mapping unit, 130

The fifth step includes a mapping step 330, to map the one or more coordinates with the target text, Target Transcription, Speech Marks, and the target audio.

Figure 2C:
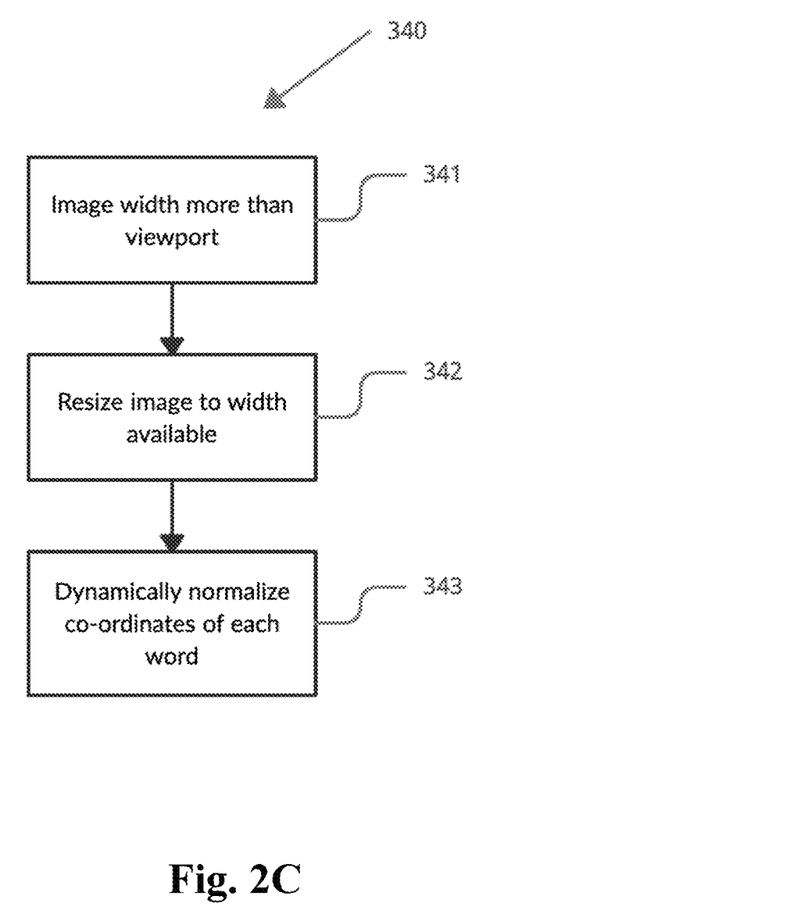
FIG. 2C represents a flowchart showing a method for dynamic resizing of image-based reference documents such as a Jpeg file using an image resizing unit, 140
Figure 2C:
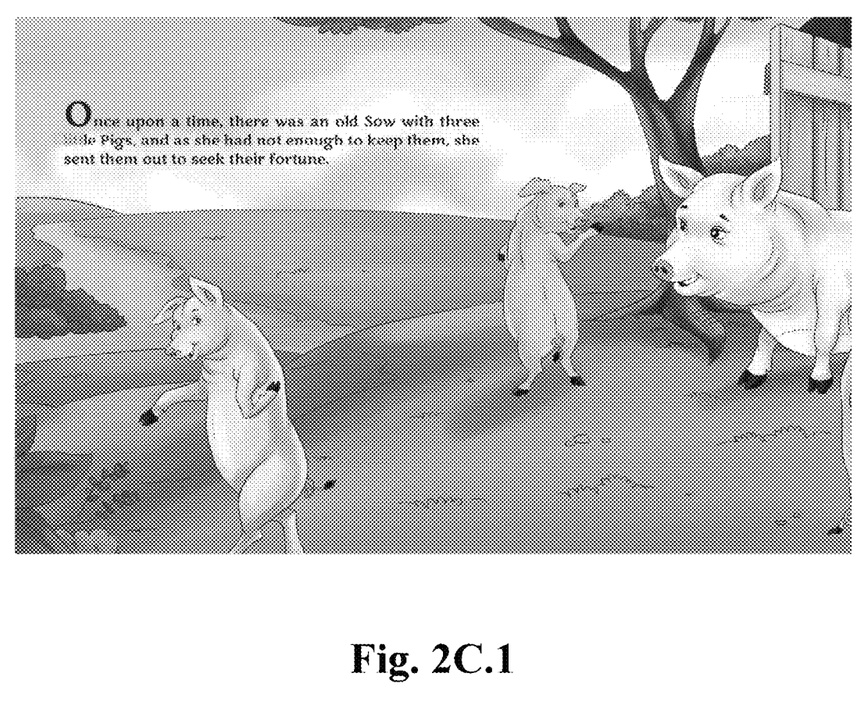
Figure 2C:
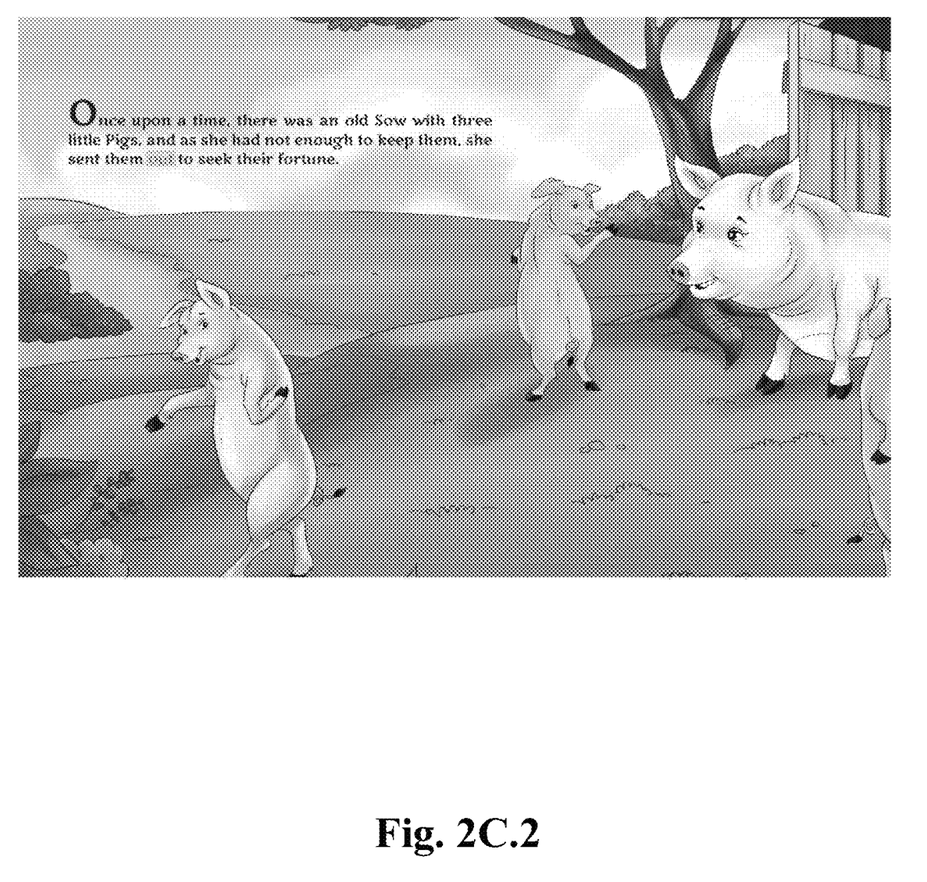

The sixth step includes an image resizing step 340 to dynamically resize the target text and a rendered text embedded within the reference document. The rendered text relates to the text displayed on a device. The device could be any standalone or handheld device. An illustration is shown with highlighting being synchronized with text because of dynamic resizing and highlighting without synchronization with text as it did not go through this step.

Figure 2D:
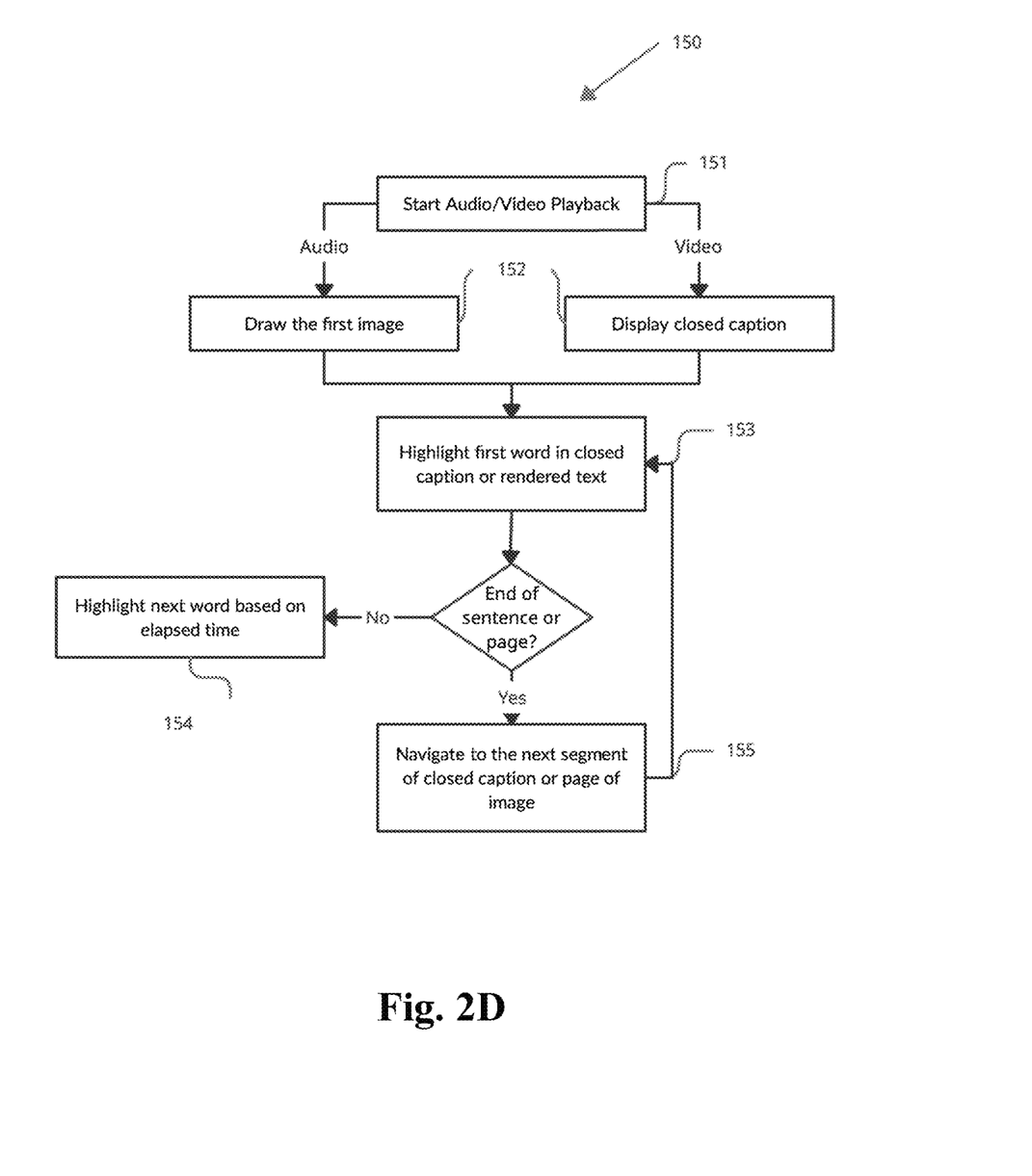
FIG. 2D represents a flowchart showing a method for synchronizing and highlighting operations executed using a Processing unit, 150
Figure 3:
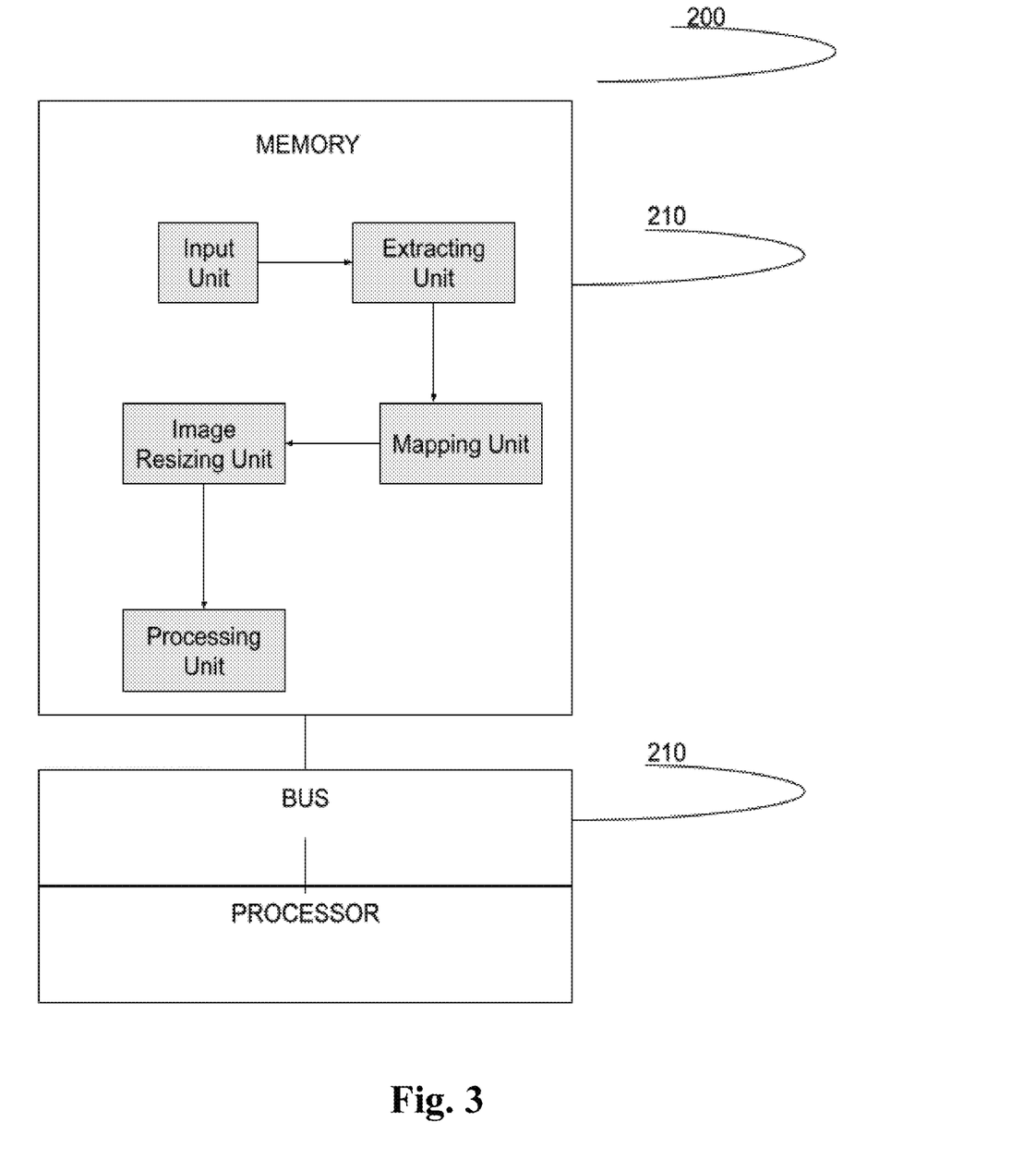
FIG. 3 represents a block diagram of a computer or a server in accordance with an embodiment of the present disclosure.
Figure 4:
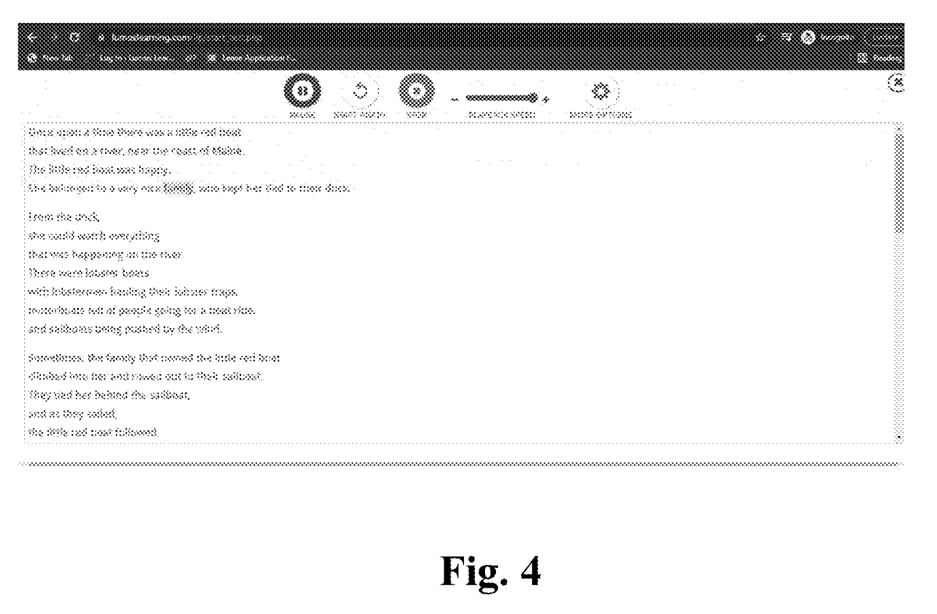
FIG. 4 represents a screenshot of the look and feel of a reference document such as an image file, before the current invention.
Figure 5:
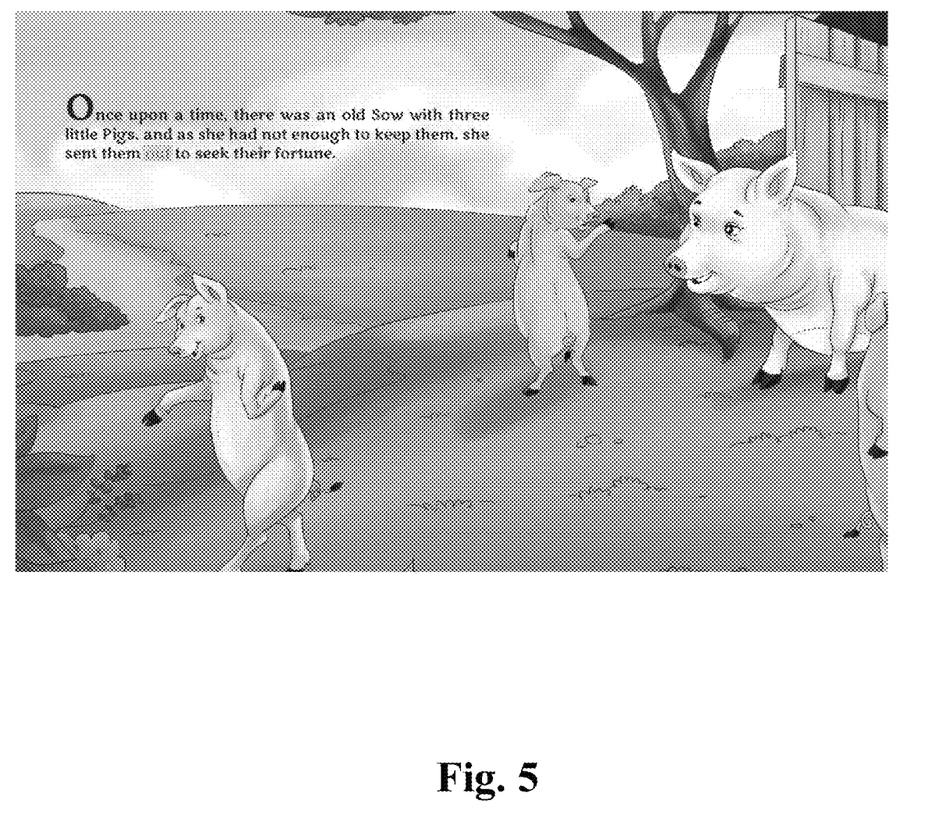
FIG. 5 represents a screenshot of the look and feel of a reference document such as an image file, after the current invention.

The seventh step includes a processing step 350 to extract to provide an enriching and close to actual reading experience during a Read-Along for learners to make them effective readers. Read-Along refers to either computer-generated audio or an expert reader reading the target text. The Processing unit synchronizes the target audio with the target text embedded within a reference document and Speech Marks for the target text and the Target Transcription and one or more coordinates for the target text embedded within an image-based reference document such as a jpeg document.

The eighth step includes a processing step 350 to highlight the rendered text based on the target audio during the Read-along. Once the User decides to execute the Read-Along operation, the processing unit will draw the first image onto a drawing surface, play the target audio, and highlight rendered text based on the elapsed time.

The ninth step includes a processing step 350 to highlight the rendered text based on the target video during playback. Once the User decides to play the target video, the processing unit will display a closed caption of the Target Transcription and highlight rendered text based on the elapsed time. The tenth step includes a processing step 350 to highlight the rendered text based on the color of preference of the users.

The eleventh step includes a processing step 350 to play the target audio or video and begin highlighting the target text based on the elapsed time. Each word is highlighted by creating a rectangle, with slight padding, around that word, using its coordinates, and filling it with color.

The twelfth step includes a processing step 350 to provide automatic navigation from one page to another to have a continuous stream of the target audio. This embodiment is beneficial as it provides for a continuous stream of the target audio.

Suppose the target text is within a reference document in a pdf format. In that case, the final step includes a processing step 350 to allow the User to select any target text on any page to start reading from that selected target text. This embodiment is beneficial as it allows the User to begin practicing their reading from the last stopped position.

What is claimed is:

1. A system for synchronizing a target text of a reference document with an audio of said reference document, the system comprising:
    an input unit adapted to receive the reference document;
    an extracting unit adapted to extract the target text from the reference document within the reference document itself and generate the audio of the reference document from the target text;
    memory;
    a mapping unit;
    a processing unit adapted to generate a rendered text and one or more speech marks from the target text of the reference document, synchronize the rendered text with the audio of the reference document, and dynamically highlight a portion of the rendered text that is synchronized with a portion of the audio as heard by a user at any given time in order to provide the user with a Read-Along; and
    an image resizing unit adapted to dynamically resize the rendered text,
    wherein an expert reader edits the target text by adding and removing words from the target text.

2. The system of claim 1, wherein the processing unit is further adapted to continue from a position of the rendered text as selected by a user.

3. The system of claim 2, wherein the reference document is a PDF file.

4. The system of claim 2, wherein the reference document is a jpeg file.

5. The system of claim 4, wherein the extracting unit is further adapted to extract one or more coordinates from the reference document and determine locations of the target text based on the assigned coordinates.

6. The system of claim 5, wherein the mapping unit is further adapted to map the one or more coordinates to the target text and to the one or more speech marks.

7. The system of claim 6, wherein the processing unit is further adapted to normalize the coordinates associated with the target text and to dynamically adapt the size of the rendered text.

8. The system of claim 1, wherein the reference document is a video file, and wherein the target text is a target transcription, and wherein the rendered text is a closed caption.

9. The system of claim 1, wherein the reference document is a book comprising a plurality of pages.

10. The system of claim 9, wherein the processing unit is further adapted to automatically navigate from one page of the reference document to another page of the reference document in order to create a continuous stream of audio and rendered text.

11. A method for synchronizing a target text of a reference document with an audio of said reference document, the method comprising:
    receiving the reference document;
    extracting the target text from the reference document within the reference document itself;
    editing the target text by adding and removing words from the target text;
    generating the audio of the reference document from the target text;
    generating a rendered text and one or more speech marks from the target text of the reference document;
    synchronizing the rendered text with the audio;
    dynamically resizing the rendered text; and
    dynamically highlighting a portion of the rendered text that is synchronized with a portion of the audio as heard by a user at any given time in order to provide the user with a Read-Along.

12. The method of claim 11, wherein highlighting a portion of the rendered text comprises a colored highlighting, and wherein the color and font size of said highlighting can be selected by the user.

13. The method of claim 11, wherein the reference document is a PDF file.

14. The method of claim 11, wherein the reference document is a jpeg file.

15. The method of claim 14, further comprising generating one or more coordinates from the reference document and determining locations of the target text based on the assigned coordinates.

16. The method of claim 15, further comprising mapping the one or more coordinates to the target text and to the one or more speech marks.

17. The method of claim 16, further comprising normalizing the coordinates associated with the target text and dynamically adapting the size of the rendered text.

18. The method of claim 11, wherein the reference document is a video file, and wherein the target text is a target transcription, and wherein the rendered text is a closed caption.

19. The method of claim 11, further comprising starting the dynamically highlighting of a portion of the rendered text when said portion is selected by a user.

20. A computer program stored on a non-transitory, computer-readable medium and adapted to be executed on one or more processors, wherein the non-transitory computer-readable medium and the one or more processors are adapted to be coupled to a communication network interface, and wherein the computer program on execution enables the one or more processors to perform the steps comprising:
    receiving a reference document;
    extracting a target text from the reference document within the reference document itself;
    generating an audio from the target text;
    generating a rendered text and one or more speech marks from the target text of the reference document;
    synchronizing the rendered text with the audio;
    dynamically resizing the rendered text; and
    dynamically highlighting a portion of the rendered text that is synchronized with a portion of the audio as heard by a user at any given time in order to provide the user with a Read-Along.

* * * * *